United States Patent [19]

Fuderer

[11] 4,414,191
[45] * Nov. 8, 1983

[54] PROCESS FOR THE PRODUCTION OF AMMONIA

[75] Inventor: Andrija Fuderer, Antwerp, Belgium

[73] Assignee: Union Carbide Corporation, Danbury, Conn.

[*] Notice: The portion of the term of this patent subsequent to Mar. 1, 2000 has been disclaimed.

[21] Appl. No.: 290,926

[22] Filed: Aug. 7, 1981

[51] Int. Cl.³ .............................................. C01C 1/04
[52] U.S. Cl. ...................................... 423/359; 55/25; 55/26; 422/148
[58] Field of Search ...................... 423/359; 55/25, 26; 422/148

[56] References Cited

U.S. PATENT DOCUMENTS 3,176,444  4/1965  Kiyonaga ................................. 55/62
3,430,418  3/1969  Wagner ................................... 55/25
3,986,849  10/1976 Fuderer et al. ......................... 55/25
4,224,299  9/1980  Barber et al. .......................... 423/359

FOREIGN PATENT DOCUMENTS 855126  9/1980  Belgium .
898058  6/1962  United Kingdom ................... 55/62

Primary Examiner—Edward J. Meros
Assistant Examiner—Wayne A. Langel
Attorney, Agent, or Firm—Alvin H. Fritschler

[57] ABSTRACT

In a pressure swing adsorption system for the purification of hydrogen to be used in an ammonia synthesis gas, nitrogen is employed as a purge gas at an elevated purge pressure. The hydrogen recovered at adsorption pressure contains about 20–25% nitrogen and is advantageous for use as said ammonia synthesis gas. The purge gas is expanded to generate power that can be used to compress air being passed to an air separation system. The nitrogen recovered therein can be employed as said purge gas, while the oxygen recovered can conveniently be employed in a hydrogen generation system used to form said hydrogen passed to the pressure swing adsorption system.

31 Claims, 1 Drawing Figure

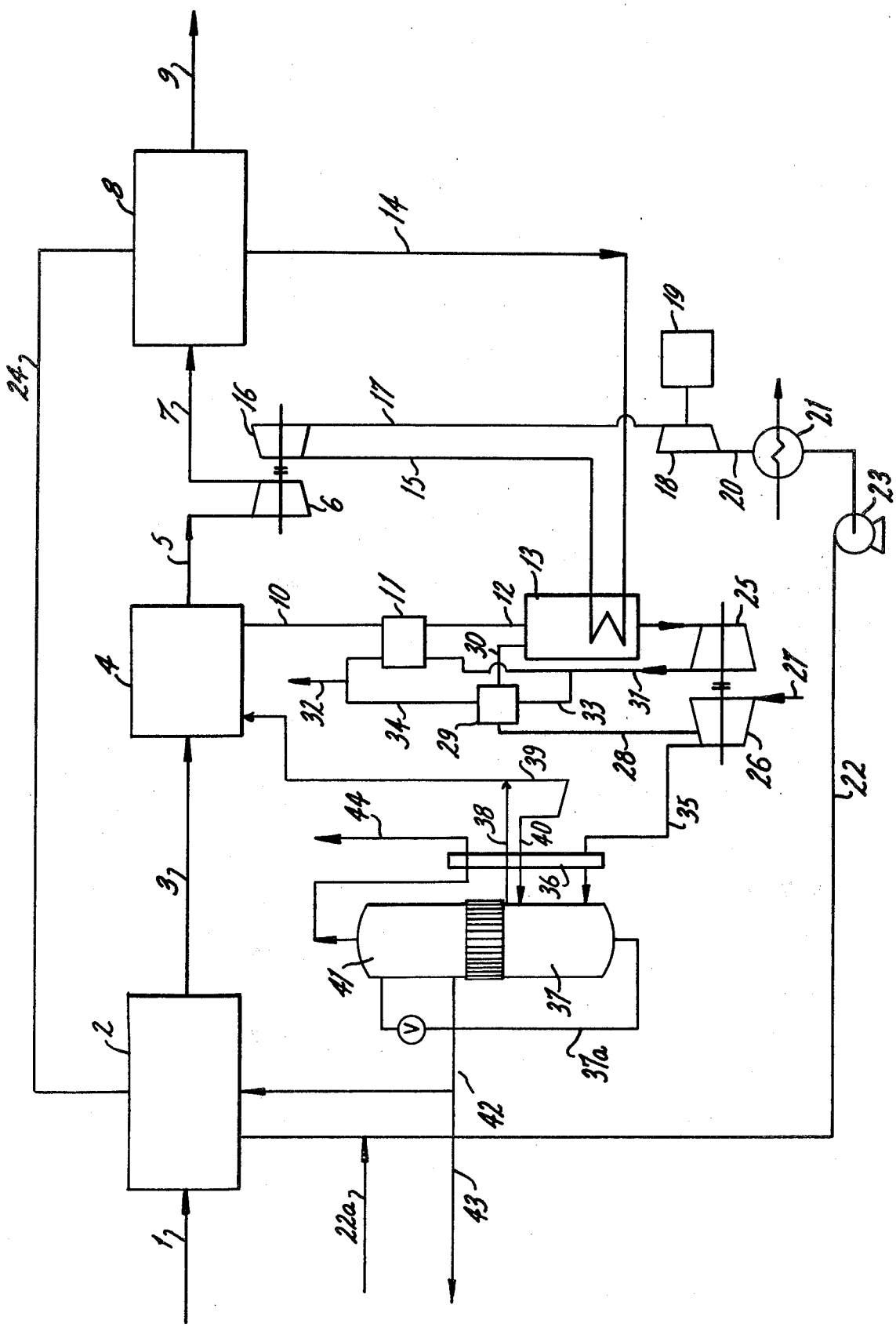

PROCESS FOR THE PRODUCTION OF AMMONIA

BACKGROUND OF THE INVENTION

1. Field of the Invention

The invention relates to the production of ammonia. More particularly, it relates to an improved process and apparatus for forming ammonia synthesis gas.

2. Description of the Prior Art

The presently standard ammonia production technology is the process based on the steam reforming of natural gas or naphtha followed by a secondary reforming with air. Efforts have been made, however, to develop energy saving cycles, particularly in light of the drastic increase in energy costs that has occurred in recent years. Most of such developments do not employ pressure swing adsorption (PSA) technology for the purification of hydrogen to be employed in an ammonia synthesis gas stream.

The alternates to PSA-hydrogen purification include wash systems for carbon dioxide removal and methanation operations or a nitrogen wash for carbon monoxide removal. None of the alternate approaches provides for the complete removal of all contaminants and inerts from the hydrogen-containing gas to be purified in a single purification step. The potential for process simplification offered by the PSA-hydrogen purification process represents a desirable feature of this approach as compared with the alternates known in the art. This is of particular commercial significance since ammonia production constitutes the largest hydrogen consumer of all chemical processing industries. In addition to the growing market for ammonia, old ammonia plants are becoming obsolete, and a number of large new plants are being built to satisfy the demand for ammonia in more economical systems to offset the continually rising cost of energy.

The presently preferred feedstock for ammonia production is natural gas. Where natural gas is expensive or unavailable, naphtha is the next most preferred feedstock, but is found to be rapidly increasing in value, leading to a growing trend to base commercial plants on heavier petroleum fractions and coal. These feedstocks require oxygen for partial oxidation, generally with an oxygen supply from a captive air separation system. The nitrogen recovered from such a system can, of course, be employed in the overall ammonia synthesis operation.

It has heretofore been proposed to employ external source nitrogen as a purge gas in the purification of hydrogen used for ammonia production, as evidenced by Belgium patent No. 855, 126. As in conventional PSA processing, the external source nitrogen purge is utilized in such an approach at as low a pressure as possible, e.g., about 1.6 to 2 Bar absolute, so as to minimize the purge gas flow rate and compression power requirements. This has been consistent with the need to develop economical techniques for reducing the costs of producing ammonia synthesis gas.

It will be evident, however, that further improvements in the field of ammonia production are desirable in the art. In light of the high costs of energy, such improvements that may particularly enable energy costs to be reduced are especially desirable, and even necessary, if ammonia synthsis gas and ammonia are to be available at economical costs to satisfy growing industrial requirements.

It is an object of the invention, therefore, to provide an improved process and apparatus for the production of ammonia.

It is another object of the invention to provide a process and apparatus for the reduction of the energy costs associated with production of ammonia synthesis gas.

It is a further object of the invention to provide an improved PSA hydrogen purification system for use in the production of ammonia.

With these and other objects in mind, the invention is hereinafter described in detail, the novel features thereof being particularly pointed out in the approved claims.

SUMMARY OF THE INVENTION

Nitrogen at an elevated pressure is effectively utilized to purge a PSA-hydrogen system, with the elevated pressure enabling a highly desirable ammonia synthesis gas to be recovered from the system. In addition, the elevated purge pressure enables the purge gas to be used for power generation, most advantageously in an overall, integrated system including hydrogen generation, PSA-hydrogen purification, ammonia synthesis and air separation. The generated power can be used for said air separation, with recovered nitrogen being used as said elevated pressure purge and with recovered oxygen being used in the generation of said hydrogen.

BRIEF DESCRIPTION OF THE DRAWING

The invention is hereinafter further described with reference to the accompanying single figure drawing comprising a schematic representation of an embodiment thereof illustrating the overall integrated system for the production of ammonia.

DETAILED DESCRIPTION OF THE INVENTION

In the practice of the invention, a PSA-hydrogen purification system is employed with nitrogen at elevated pressure being used as purge gas. The purified hydrogen recovered from the system at its higher adsorption pressure is surprisingly and significantly found to contain sufficient nitrogen for use as an ammonia synthesis gas stream. In addition, the purge gas is available at said elevated pressure and is advantageously employed for power generation purposes. In the preferred overall, integrated system of the invention, air being passed to an air separation system is compressed by a compressor. The power for driving the compressor is produced by the expansion of said purge gas to lower pressure. Nitrogen recovered from said air separation system is advantageously employed as said purging gas, while oxygen recovered therein may be employed in a hydrogen generation system in which the hydrogen passed to the PSA-hydrogen purification system is generated. By such use of elevated pressure nitrogen for purging the adsorbent bed and the integration of the overall system to the various degrees herein disclosed and claimed, the invention is capable of achieving the stated objectives in a manner highly desirable and beneficial to the art.

Referring to the drawing, those skilled in the art will appreciate that various major portions of the illustrated embodiment comprise well established, commercial technology benefited by the integration made possible by the practice of the invention. Thus, the basic PSA-hydrogen purification system is well known and established in the art, apart from the novel features as herein described and claimed. Similarly the air separation, hydrogen generation and ammonia synthesis systems employed in the overall integrated embodiments of the invention are well known and established technologies. The beneficial result of the present invention resides, with respect to such known systems, in their integration in a manner contributing significantly to the production of low energy ammonia thereby.

Referring more specifically to the drawing, a feed gas is passed in line 1 to hydrogen generation system 2 from which a hydrogen-containing stream is passed through line 3 to a multiple bed PSA system 4 in which impurities are adsorbed so that a purified hydrogen gas stream is discharged from said system 4 through line 5. As indicated above, the unadsorbed, purified hydrogen stream will contain, in the practice of the invention, nitrogen in amounts advantageous for ammonia synthesis gas purposes. Said hydrogen-nitrogen synthesis gas stream in line 5 is essentially at the adsorption pressure employed in PSA system 4 and is further compressed in compressor 6 before being passed through line 7 to ammonia synthesis unit 8 from which product ammonia is recovered through line 9.

Purge gas removed from PSA system 4 through line 10 at the elevated purge presence of the invention comprises nitrogen, methane, carbon oxides and hydrogen. It is passed to heat exchanger 11 for preheating therein before being passed through line 12 to combustion chamber 13 wherein it is combined with air and subjected to combustion, thereby generating a source of heat used to superheat steam that passes to said combustion chamber from ammonia sysnthesis unit 8 through line 14. The superheated steam leaves combustion chamber 13 through line 15 and passes therein to steam turbine 16 that is used to drive said compressor 6.

The exhaust from steam turbine 16 is discharged through line 17 to turbine 18 for expansion therein, providing the power to drive generator 19. The expanded steam leaving turbine 18 is passed through line 20 to heat exchanger 21 for cooling, with process water being passed therefrom in line 22 containing pump 23 for passage, together with make-up water from line 22a, to hydrogen generation system 2. As shown, water is passed from hydrogen generation system 2 through line 24 to ammonia synthesis unit 8 for the generation of said steam that exits from unit 8 through line 14 as noted above.

After preheating in exchanger 11 and combustion in chamber 13, the purge gas is passed to gas turbine 25. The purge gas is expanded therein, thus generating power to drive air compressor 26 to which air is passed through line 27. A portion of the air compressed in said compressor 26 is passed therefrom through line 28 to exchanger 29 for preheating therein before being passed through line 30 to said combustion chamber 13. The expanded purge gas leaving compressor 25 is passed through line 31 to heat exchanger 11 for cooling therein against the warming purge gas stream leaving PSA system 4 through line 10. Said cooled purge gas is withdrawn from exchanger 11 through line 31 for discharge to stack line 32. A portion of said expanded purge gas in line 31 is diverted, however, for passage through line 33 to said heat exchanger 29. In said exchanger 29, said portion of expanded purge gas is cooled against warming compressed air from line 28. The thus-cooled purge gas leaves exchanger 29 through line 34 for discharge to said stack line 32.

Compressed air from said compressor 26 is passed in line 35 through heat exchanger 36 to the lower portion of bottom column 37 of an air separation system. This system is operated as a nitrogen column with by-product high purity oxygen. High purity gaseous nitrogen is extracted at the top of lower column 37 through line 38 and passes through said exchanger 36. A portion of said gaseous nitrogen is diverted from said line 38 for passage through compressor 39 and return to column 37 through line 40 passing through said heat exchanger 36. Bottom liquid removed from column 37 through line 37a is subcooled and introduced to the top of upper column 41 of said air separation system 38. High purity oxygen is removed from the lower portion of upper column 41 through line 42 for passage to hydrogen generation system 2, or alternatively, through line 43 for export. Waste gas removed from upper column 41 is conveniently passed in line 44 through heat exchanger 36 for warming therein against cooling streams entering air separation unit 38 prior to discharge from the system.

High purity gaseous nitrogen leaving exchanger 36 under pressure in line 38 is passed to PSA system 4 as purge gas completing the overall process of the illustrated embodiment. As described above with reference to the invention, the use of nitrogen at elevated pressure as a purge gas in the PSA-hydrogen system has been found to result in the formation of a highly advantageous ammonia synthesis gas at the higher adsorption pressure employed in said PSA system. For the purpose, the nitrogen purge gas is desirably employed at an elevated purge gas pressure of from about 60 to about 100 psia. The higher pressure adsorption pressure is conveniently from about 300 to about 1,000 psia or above. Thus, the nitrogen recovered in the ammonia synthesis gas discharged from the PSA system will be recovered at a desirably higher pressure, i.e. at 300–1000 psia, than the purge pressure at which the nitrogen is passed to said PSA system, i.e. 60–100 psia. In addition, the purge gas removed from the system at the elevated purge pressure is usefully applied for power recovery as in turbine 25 of the drawing. As will be appreciated from the description of the illustrated overall, integrated process and system that constitutes a preferred embodiment of the invention, such power recovery can effectively be employed for the air separation system, enhancing the production of said nitrogen for use as purge gas and of oxygen for use in the generation of hydrogen feed gas for the PSA-hydrogen system. Thus, the invention provides a highly desirable integration of the overall ammonia production system, reducing the energy costs associated therewith and improving the highly desirable PSA-hydrogen system that is an essential feature of the overall ammonia production process and apparatus herein disclosed and claimed.

As noted above, the PSA-hydrogen purification system as employed in the practice of the invention employs known, conventional processing cycles apart from the use of elevated pressure nitrogen as the advantageous purge gas. The PSA system comprises a multiple bed system capable of selectively adsorbing impurities from a hydrogen-containing feed gas. Each bed of the system, which preferably contains at least seven beds, e.g., a ten bed system, undergoes the known processing cycle of (1) introduction of feed gas to the bed inlet end at an adsorption pressure of from about 300 to about 1,000 psia or above, with adsorption of impurities therefrom and discharge of an unadsorbed, purified hydrogen stream from the discharge end thereof, (2) partial cocurrent depressurization of the bed with release of hydrogen-containing void space gas from the discharge end of the bed, (3) introduction of said released void space gas to the discharge end of another bed that is undergoing repressurization so as to equalize the pressure therebetween, (4) countercurrent depressurization of the bed with release of gas from the inlet end thereof for blowdown of the bed to its lower desorption pressure, (5) introduction of purge gas to the discharge end of the bed at its desorption pressure for the purging thereof, with the discharge of said purge gas from the inlet end of the bed, (6) repressurization of the purged bed to said adsorption pressure, and (7) repetition of said cyclic steps with additional quantities of hydrogen-containing feed gas. Further information relating to such PSA processing can be found, for example, in the Wagner patent, U.S. Pat. No. 3,430,418 and in the Fuderer et al patent, U.S. Pat. No. 3,986,849 that relates specifically to multiple bed systems in which at least seven adsorbent beds are employed. In the practice of the invention, however, nitrogen is passed to the discharge end of each bed, at the appropriate point in its processing cycle, at an elevated purge pressure of from about 60 to about 100 psia, with said nitrogen being obtained, in preferred embodiments of the invention, from an air separation system utilizing air compressed by power generated by the purge gas discharged from the PSA system and passed to an expansion turbine essentially at said purge pressure, advantageously with heat exchange and combustion steps that serve to further recover energy values from the purge gas before it is discharged to the stack.

Upon operation of the PSA-hydrogen purification operation as described above, the unadsorbed, purified hydrogen stream withdrawn from each bed, and thus from PSA system 4 of the drawing, at the adsorption pressure contains from about 16% to about 26% by volume nitrogen, preferably between about 20% and about 25%, typically about 23%. This nitrogen will be understood to comprise residual amounts of the nitrogen purge gas remaining in the bed upon completion of the purge. The purified hydrogen-nitrogen gas from the PSA system of the invention, therefore, is highly suitable for ammonia synthesis operations, alone or together with the addition of small amounts of additional nitrogen to approximate more closely a 3:1 H/N mixture. As shown in the drawing, the hydrogen—nitrogen gas mixture from PSA system 4 is compressed in compressor 6 since the pressure required for ammonia synthesis is generally greater than that employed for PSA adsorption, e.g., on the order of 2,000–4,000 psig. In the overall integrated operation of the invention, compression of the synthesis gas is accomplished by expansion of superheated steam in turbine 16, which drives synthesis gas compressor 6. In turn, said superheated steam is produced in combustion chamber 13 in which the purge gas is subjected to combustion, preferably with air compressed by use of the power generated by the passage of the purge gas through turbine 25. The elevated purge pressure, therefore, produces highly desirable benefits not only in the hydrogen-nitrogen synthesis gas mixture produced in the PSA system, but also in the energy economies flowing from the availability of the purge gas discharged from the PSA system at said elevated pressure.

The hydrogen generation system employed in the practice of the invention can comprise any convenient, commercially available technology. Hydrogen may be produced, for example, by steam reforming of natural gas or naphtha feedstocks, by partial oxidation of hydrocarbon feedstocks, or by coal gasification. Regardless of the type of hydrogen production process employed in any particular application, it will be understood that the hydrogen-containing gas stream produced will typically contain a number of impurities, such as carbon dioxide, carbon monoxide, methane and water. Those skilled in the art will appreciate that various well known, conventional steps may be employed to treat the hydrogen stream prior to final purification in the PSA system of the invention, although such steps are not illustrated in the drawing. Thus, the hydrogen-containing gas may be subjected to carbon monoxide shift conversion for removal of carbon monoxide, carbon dioxide removal by suitable selective solvents, etc. before passage to the PSA system for final purification of the hydrogen to be used for ammonia synthesis.

In a particularly desirable hydrogen generation system, a major portion, e.g., about 60–70%, of a hydrocarbon feed stream can be subjected to catalytic steam reforming in the reformer tubes of a primary reformer, with the hot effluent optionally being passed to a secondary reforming zone for reaction of unconverted hydrocarbon present in the reformed gas mixture with air or oxygen. The heat required for convention primary reforming is usually supplied by burning a fluid hydrocarbon fuel with air in the primary reforming zone external to the catalyst-filled reformer tubes therein. The hot effluent from said primary or secondary reforming operations is thereafter mixed with the hot effluent from the catalytic steam reforming of the remaining portion of the feed discharged from the reformer tubes of a primary reformer-exchanger. The combined effluent is passed on the shell side of the reformer-exchanger countercurrently to the passage of feed in the reformer tubes of the reformer-exchanger, thus supplying the heat for the reforming of the portion of the feed passed through the reformer tubes of the reformer-exchanger unit. Alternately, the major portion of the hydrocarbon feed stream can be subjected to partial oxidation, e.g., using the oxygen from the air separation system of the invention, with the remainder of the feed stream being processed in the reformer-exchanger unit, utilizing the heat of the combined effluent streams on the shell side of the reformer-exchanger as described above.

The air separation system of the invention is operated as a nitrogen column with by-product high purity oxygen, said system being simpler than the typical large air separation plant. The upper column thus needs no nitrogen purification section and no liquid nitrogen reflux. Compared to the same capacity conventional oxygen plant, the diameter of the lower column will likely be over 20% larger, but the diameter of the upper column can be about 10% smaller. The number of trays in the upper column can be reduced since there is no nitrogen recovery section therein. Oxygen recovery is about 67% in such a system, and the waste gas contains about 16% oxygen. Such an air separation system is not, in itself, new. Its use to furnish nitrogen from the lower column at elevated pressure for PSA purge purposes represents a desirable embodiment of the overall process for achieving energy savings in addition to enhanced ammonia synthesis gas production. It will be understood that the air separation system may be operated in other known embodiments, as by the production of lower pressure nitrogen, e.g., 15 psia, from the top of the upper column, with said nitrogen thereafter being pressurized to the desired purge pressure by suitable compressor means. The extraction of nitrogen from the lower column of the air separation plant or system, at elevated pressure, accepts a lower oxygen production than in the conventional air separation plant, but simplifies the nitrogen compression requirements for the purge gas to the PSA system.

It will be understood that various other changes and modifications can be made in the various aspects of the invention, as described and illustrated with respect to particular embodiments, without departing from the scope of the invention as recited in the appended claims. For example, the purge gas discharged from the PSA system in the illustrated embodiment is preheated, e.g., to from about 300° C. to about 600° C., prior to passage to an expansion turbine for power generation purposes. The drawing also shows the preheated gas passing to a combustion zone prior to passage to said turbine. The outlet gas from the combustion chamber was shown as being cooled, as for example to about 600°–1,000° C., before entering the expansion turbine. The heat removed from the outlet gas is conveniently used to generate steam from feedwater and/or to superheat steam as was shown in the drawing. It will be appreciated that the preheated gas may also be expanded in the turbine prior to combustion with oxygen or air, or an oxygen-rich gas. In this latter embodiment, the heat generated in the combustion zone can be used to generate steam, as by the passage of feed water through the combustion zone. The available heat can of course, be utilized in any other convenient manner to improve the energy efficiency of the overall ammonia production operation. As was illustrated in the drawing, the purge gas, after being preheated and passed to the combustion zone and the expansion turbine, regardless of the sequence employed, is desirably cooled in heat exchangers against the warming compressed air stream passing to the combustion zone and the warming purge gas passing from the PSA system to said combustion zone and expansion turbine.

It is within the scope of the invention to extract oxygen from the air separation system either in gaseous or in liquid form for use in the hydrogen generation system or for other purposes. When gaseous oxygen is extracted, it is thereafter compressed in an oxygen compressor to the pressure required for use in the hydrogen generation unit, generally on the order of 500–1,000 psia. Alternately, the air separation unit can be operated so that sufficient nitrogen is compressed to a higher pressure, e.g., between 300 and 1,000 psia, liquified and recycled back to the lower column to allow extraction of liquid oxygen from the lower column. This liquid oxygen can then be pumped to the high pressure required in the hydrogen generation system, e.g., 400–1200 psia, thus making it unnecessary to employ an oxygen compressor.

The oxygen obtained from the air separation unit, in whatever form, is advantageously employed to supply the oxygen requirements of the various alternate types of hydrogen generation units that may be employed in the practice of the invention. Thus, the oxygen may be supplied to partial oxidation or coal gasification type hydrogen generation systems. The oxygen may also be used for secondary reforming in hydrogen generation units employing both primary and secondary reforming of the hydrocarbon feed material. It will be readily apparent that part of the gaseous or liquid oxygen extracted may be used for hydrogen generation, with the remainder of the available oxygen being exported for other purposes. It is also within the scope of the invention to utilize an argon purification column to separate and export argon from the air separation unit.

Those skilled in the art will appreciate that various other modifications can be made in various aspects of the overall process and apparatus without departing from the scope of the invention. Secondary reforming of the feed gas with oxygen reduces the size of the primary reformer and the heat requirements hereof, and the bypassing of a part of said feed gas, e.g., 30–40% thereof, around the primary reformer for introduction directly to the secondary reformer, together with primary reforming effluent, enables a substantial saving in the dilution steam requirements of the hydrogen generation operation. In other embodiments, a partial oxidation unit may conveniently be employed together with a reformer exchanger unit as referred to above. In the air separation system, it is also feasible to compress one part of the air being passed to said system to, for example, about 80–100 psia, while another part thereof is compressed, for example, to about 300–900 psia. The air compressed to the higher pressure is thereby liquified and introduced to the air separation system as a liquid, thereby facilitating the extraction of liquid oxygen from said system. The liquified oxygen extracted from the system can thereafter be pumped, as was initiated above, to high pressure making unnecessary the use of an oxygen gas compressor.

In an illustrative example of the practice of the invention utilizing the overall, integrated embodiment of the drawing, methane feed gas is conveniently passed to a partial oxidation hydrogen generation unit for reaction therein with oxygen recovered from the air separation unit. The hydrogen-containing gas stream generated will generally contain from about 60 to about 75% hydrogen, together with about 25% carbon dioxide and small amounts of carbon monoxide and methane. The gas stream is passed to a conventional initial purification system such as a liquid solvent wash column, not shown in the drawing, from which the hydrogen-containing stream is passed to, e.g., a ten bed, PSA system for final purification. In accordance with the invention, nitrogen at, e.g., 80 psia, is employed as purge gas in the PSA processing cycle. The purified hydrogen recovered from the PSA system is found to contain about 23% nitrogen as a result of the use of nitrogen under such elevated purge pressure conditions. The purified hydrogen-nitrogen gas stream is thus an advantageous ammonia synthesis gas that is compressed to synthesis pressure, e.g., 3000 psia, and converted to ammonia product gas. Power for compression of the synthesis gas is furnished by a steam turbine driven by superheated steam generated from the heat recovered from the impurity-containing purge gas discharged from the PSA system. The purge gas is initially preheated against expanded purge gas being discharged to the stack. The preheated purge gas at about 75 psia in passed to a combustion zone where it is subjected to combustion at 1200°–1300° C. with compressed air. The heat generated thereby is used to superheat said steam used to drive the steam turbine supplying the power for the compressor used to compress said ammonia synthesis gas recovered from the PSA system. The purge gas leaving the combustion zone at, e.g., 74 psia and 740° C., is expanded in a gas turbine and discharged to the stack after passing through heat exchangers to warm compressed gas being passed to the combustion zone and the purge gas passing from the PSA system to the combustion zone. The power generated in the gas turbine is used to drive an air compressor from which air is obtained at e.g., 100 psia. A portion of the compressed air is preheated and passed to said combustion zone, while the remainder is passed to an air separation unit adapted to produce nitrogen gas at what 80 psia for use as the purge gas in the PSA unit. Waste gas from the air separation unit at, e.g., −300° F., can be used to cool compressed air entering the separation unit at the bottom of the lower column maintained at about −260° F. Liquid oxygen extracted from the system is passed at, for example, 600 psia to the partial oxidation unit for reaction with additional quantities of methane feed gas. For further energy recovery, the steam leaving the steam turbine used for driving the synthesis gas compressor at about 70 psia is further expanded to generate power and is cooled to condense process water that can be used for cooling, boiler feed purposes and the like.

The purge gas effluent obtained from the PSA unit in the practice of the invention can be efficiently employed for power generation purposes. This effluent, which contains hydrogen, methane and carbon oxides as well as nitrogen, is available at elevated pressure and, in the illustrative example, is subjected to combustion and expanded in a gas turbine for power generation purposes. In the example based on a 1,000 ton per day ammonia plant, gas turbine power of 15,000 kW can be obtained. Such power is conveniently employed, as in the example, to drive the compressor for compressing air used both for purge gas combustion and for treatment in the air separation unit. In turn, the nitrogen obtained therefrom is used as the nitrogen purge gas at elevated pressure. Extracted oxygen is likewise employed in the overall process and system upon passage to the hydrogen generation unit from which the hydrogen-containing feed gas to the PSA unit is obtained. Because of these overall economics, the invention is able to provide pure synthesis gas and product ammonia at lower energy costs than can be obtained by other technologies presently available in the art. Thus, the most competitive alternate processes require at least about 5 to 10% more feed and fuel than is required for the advantageous production of ammonia in the practice of the invention. The elevated pressure nitrogen purge likewise enables the design of the PSA system to be simplified as a result of the lower pressure drop across the adsorbent beds. Such enhancement of the PSA system and the desirable production of an effective ammonia synthesis gas therefrom at the adsorption pressure of the system contribute significantly to the overall benefits of the invention and the highly desirable use of the pressure swing adsorption process for ammonia production.

Therefore, I claim:

1. An improved process for the production of ammonia comprising:
   (a) passing a hydrogen-containing feed gas at an adsorption pressure of from about 300 to about 1,000 psia to a multiple bed pressure swing adsorption system capable of selectively adsorbing impurities from said hydrogen, each bed of said system undergoing the processing cycle of:
      (i) introduction of feed gas to the bed inlet end at said adsorption pressure, with adsorption of impurities therefrom and discharge of an unadsorbed, purified hydrogen stream from the discharged end thereof;
      (ii) partial cocurrent depressurization of the bed with release of hydrogen-containing void space gas from the discharge end of the bed;
      (iii) production of said released void space gas to the discharge end of an adsorption bed undergoing repressurization to equalize the pressure therebetween;
      (iv) countercurrent depressurization of the bed with release of gas from the inlet end thereof for blowdown to its lower desorption pressure;
      (v) introduction of purge gas to the discharge end of the bed at its desorption pressure for the purging thereof, with the discharge of said purge gas from the inlet end of the bed; and
      (vi) repressurization of the purged bed to said adsorption pressure; and
      (vii) repetition of said cyclic steps (i)–(vi) with additional quantities of feed gas;
   (b) passing nitrogen to the discharge end of each bed as said purging gas at an elevated purge pressure of from about 60 to about 100 psia, the unadsorbed, purified hydrogen stream, withdrawn from each bed at said adsorption pressure during the next succeeding adsorption step containing from about 16% to about 26% by volume nitrogen, said nitrogen comprising residual amounts of purge gas remaining in the bed upon completion of said purge; and
   (c) synthesizing ammonia from said purified hydrogen-nitrogen gas discharged from said adsorption system, whereby the purified hydrogen-nitrogen gas discharged from said pressure swing adsorption system at said adsorption pressure can advantageously be employed for the synthesis of ammonia.

2. The process of claim 1 and including expanding the purge gas discharged from the inlet end of the bed at said pressure of from about 60 to about 100 psia in an expansion turbine, thereby generating power and further enhancing the overall ammonia synthesis process.

3. The process of claim 2 in which said purge gas is expanded to about atmospheric pressure.

4. The process of claim 2 and including heating said purge gas by indirect heat exchange with said expansion turbine exhaust gas prior to passage of said purge gas to the expansion turbine.

5. The process of claim 4 in which said purge gas is preheated to from about 300° C. to about 600° C.

6. The process of claim 5 in which said preheated and expanded purge gas is combined with air in a combustion zone and subjected to combustion, thereby generating a source of heat.

7. The process of claim 6 and including passing feed water or steam through said combustion zone, thereby generating or superheating steam.

8. The process of claim 5 in which said preheated purge gas is passed to a combustion zone prior to passage to said expansion turbine.

9. The process of claim 8 in which said preheated purge gas is used to indirectly superheat steam prior to passage to said expansion turbine.

10. The process of claim 9 and including passing said superheated steam to a steam turbine-compressor unit for expansion therein, said steam turbine driving the compressor, thereby compressing said purified hydrogen-nitrogen gas prior to the synthesis of ammonia therefrom.

11. The process of claim 2 and including driving an air compressor with said power generated by the passage of purge gas through said expansion turbine.

12. The process of claim 11 and including subjecting said purge gas to combustion with air, oxygen, or oxygen-rich gas.

13. The process of claim 12 in which a portion of the air compressed by the power generated by the passage of purge gas through said expansion turbine is employed for said combustion of the purge gas.

14. The process of claim 13 in which said purge gas is preheated and is passed to a combustion zone for said combustion prior to passage to said expansion turbine.

15. The process of claim 13 in which said purge gas is preheated prior to passage to said expansion turbine and is thereafter passed to a combustion zone for said combustion with compressed air.

16. The process of claim 11 and including passing compressed air from said compressor to an air separation system.

17. The process of claim 16 in which nitrogen produced in said air separation system is employed as said purge gas passed to the pressure swing adsorption system at elevated purge pressure.

18. The process of claim 17 and including passing oxygen produced in said air separation system to a hydrogen generation system for use in the oxidation of hydrocarbons to produce said hydrogen-containing feed gas for the pressure adsorption system.

19. The process of claim 17 in which nitrogen is extracted from the lower column of said air separation system as elevated pressure purge gas.

20. The process of claim 17 in which relatively low pressure nitrogen is recovered from the top of the upper column and is pressurized to said purge pressure.

21. The process of claim 18 in which nitrogen is compressed to a pressure of from about 300 to about 1,000 psia, liquified and recycled back to the lower column of said air separation system, and extracting liquid oxygen from the upper column and pumping said oxygen to the pressure required in the hydrogen generation system.

22. The process of claim 21 in which said hydrogen generation system is a partial oxidation system.

23. The process of claim 21 in which said hydrogen generation system is a coal gasification system.

24. The process of claim 21 in which said hydrogen generation system comprises a primary and a secondary reforming system, said oxygen being employed for said secondary reforming.

25. The process of claim 18 in which said oxygen is extracted from the air separation system as gaseous oxygen and including compressing said oxygen to the pressure required in the hydrogen generation system.

26. The process of claim 18 in which a portion of the oxygen produced in either gaseous or liquid form is exported for purposes other than said hydrogen generation.

27. The process of claim 18 and including passing said air to be separated to an argon removal column and exporting separated argon from the air separation system.

28. The process of claim 18 in which a portion of the air being passed to the air separation system is compressed to from about 80 to about 100 psia, the remaining portion thereof being compressed to from about 300 to about 900 psia, said air compressed to the higher pressure being liquified and introduced to the air separation system as a liquid, thereby enabling liquid oxygen to be extracted from said system, and pumping said liquid oxygen to the pressure required in the hydrogen generation system.

29. The process of claim 18 in which said hydrogen generation system comprises a primary and a secondary reforming system, and including bypassing a portion of the hydrocarbon feed directly to said secondary reforming system for reaction with oxygen therein.

30. The process of claim 18 in which said hydrogen generation system comprises a partial oxidation unit and a reformer-exchanger unit, a portion of the hydrocarbon feed passing directly to said reformer-exchanger unit.

31. The process of claim 30 in which said hydrogen generation system comprises a steam reforming system including a primary reforming unit, a secondary reforming unit and a reformer exchanger unit, said oxygen being employed in the secondary reforming unit, a portion of the hydrocarbon feed being passed directly to said reformer-exchanger unit.

* * * * *